US011290417B2

(12) United States Patent
Mahadevan et al.

(10) Patent No.: US 11,290,417 B2
(45) Date of Patent: Mar. 29, 2022

(54) SYSTEM AND METHOD OF PERSISTENT ADDRESS RESOLUTION SYNCHRONIZATION

(71) Applicant: Arista Networks, Inc., Santa Clara, CA (US)

(72) Inventors: Vijay Mahadevan, Milpitas, CA (US); Dileep Honsoge Ramesh, Sunnyvale, CA (US); Adam James Sweeney, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 115 days.

(21) Appl. No.: 16/897,933

(22) Filed: Jun. 10, 2020

(65) Prior Publication Data

US 2020/0403960 A1 Dec. 24, 2020

Related U.S. Application Data

(62) Division of application No. 15/013,966, filed on Feb. 2, 2016, now Pat. No. 10,721,206.

(60) Provisional application No. 62/126,387, filed on Feb. 27, 2015.

(51) Int. Cl.

| *H04L 29/12* | (2006.01) |
|---|---|
| *H04L 61/10* | (2022.01) |
| *H04L 61/103* | (2022.01) |
| *H04L 61/45* | (2022.01) |
| *H04L 67/1095* | (2022.01) |
| *H04L 61/5046* | (2022.01) |
| *H04L 101/622* | (2022.01) |

(52) U.S. Cl.
CPC ............ *H04L 61/10* (2013.01); *H04L 61/103* (2013.01); *H04L 61/15* (2013.01); *H04L 61/2046* (2013.01); *H04L 67/1095* (2013.01); *H04L 61/6022* (2013.01)

(58) Field of Classification Search
CPC ... H04L 61/103; H04L 47/19; H04L 61/6022; H04L 45/74; H04L 47/193; H04L 45/021; H04L 45/16
See application file for complete search history.

(56) References Cited

U.S. PATENT DOCUMENTS

| 5,815,668 A | 9/1998 | Hashimoto |
|---|---|---|
| 8,693,313 B2 | 4/2014 | Negoto et al. |
| 8,787,149 B1 | 7/2014 | Ramanathan et al. |
| 2004/0131079 A1 | 7/2004 | Hegde et al. |
| 2005/0122921 A1 | 6/2005 | Seo |
| 2006/0036733 A1 | 2/2006 | Fujimoto et al. |
| 2007/0094401 A1 | 4/2007 | Gagne et al. |
| 2008/0219273 A1 | 9/2008 | Kaneko |
| 2008/0301407 A1 | 12/2008 | Albert et al. |
| 2009/0307371 A1 | 12/2009 | Okazaki et al. |

(Continued)

*Primary Examiner* — Hitesh Patel
(74) *Attorney, Agent, or Firm* — Fountainhead Law Group P.C.

(57) ABSTRACT

A method and apparatus of a device that starts an address resolution service on a network element after a boot-up of this network element is described. In an exemplary embodiment, the network element sends an indication of the boot-up. The network element further sends a request for an address resolution table and receives a reply with the requested address resolution table. In addition, the network element starts the address resolution service using the requested address resolution table.

25 Claims, 12 Drawing Sheets

(56) References Cited

U.S. PATENT DOCUMENTS

2014/0036917 A1\* 2/2014 Schrum, Jr. ........... H04L 61/103
370/392
2016/0255043 A1\* 9/2016 Mahadevan ........ H04L 61/2046
709/245
2017/0272358 A1 9/2017 Zhang et al.

\* cited by examiner

SYSTEM AND METHOD OF PERSISTENT ADDRESS RESOLUTION SYNCHRONIZATION

RELATED APPLICATIONS

This application is a divisional of U.S. patent application Ser. No. 15/013,966, filed Feb. 2, 2016, which claims the benefit of U.S. provisional application Ser. No. 62/126,387, filed Feb. 27, 2015, the entirety of which are hereby incorporated by reference.

FIELD OF INVENTION

This invention relates generally to data networking, and more particularly, to synchronizing address resolution information between two running network elements.

BACKGROUND OF THE INVENTION

Multi-chassis link aggregation (MLAG) is the ability of two or more network elements to act like a single network element when forming link bundles. This allows a host to uplink to two switches for physical diversity, while still having a single bundle interface to manage. In addition, two network elements can connect to two other network element using MLAG, with all links forwarding.

In an MLAG topology, if there is switch A as primary and switch B as secondary and the user reboots switch A, this reboot triggers a failover to switch B, with switch B assuming the role of primary. After switch A comes back up online, switch A starts MLAG negotiation where it takes the role as secondary. As switch A boots up, the switch A ports (except for a peer-link port with switch B) start in an error disabled state during a delay in the newly formed MLAG peer. This allows that the required states are synced between MLAG peers and further allows a graceful entry for switch-A into the network as an MLAG peer.

After the delay expires, the ports in switch A change its status to UP. If switch A includes routing capability, switch A uses address resolution protocol (ARP) to resolve Internet Protocol (IP) addresses to media access control (MAC) addresses of device coupled to switch A. However, the ARP table will be empty and will require ARP resolutions for the unknown hosts. Since ARP cache is not persisted/synced between the peers, there can be traffic drops till the destination is resolved.

SUMMARY OF THE DESCRIPTION

A method and apparatus of a device that starts an address resolution service on a network element after a boot-up of this network element is described. In an exemplary embodiment, the network element sends an indication of the boot-up. The network element further sends a request for an address resolution table and receives a reply with the requested address resolution table. In addition, the network element starts the address resolution service using the requested address resolution table.

In another exemplary embodiment, the network element starts an address resolution service after a boot-up of a first processing unit in the network element. The network element periodically synchronizes software address resolution information between the first and a second processing unit of the network element. The network element further receives an indication of the boot-up of the first processing unit. The network element determines differences between the hardware address resolution information and the software address resolution information. The network element further reconciles the differences so that the hardware and the software address information include the same address resolution entries. In addition, the network element starts the address resolution service on the first processing unit.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
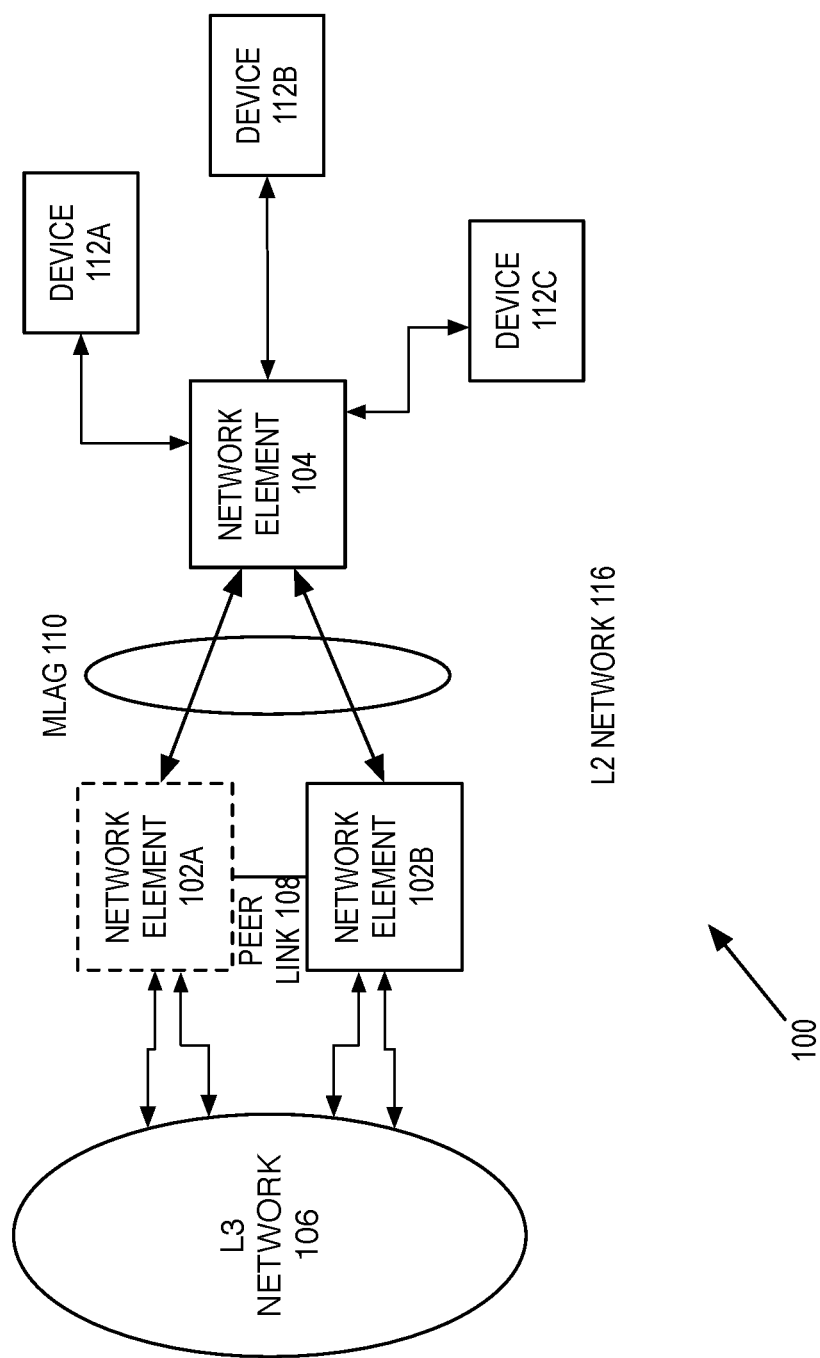
FIG. 1 is a block diagram of one embodiment of a system with a multi-chassis link aggregation (MLAG) topology for a pair of network elements.

A method and apparatus of a device that starts an address resolution service on a network element after a boot-up of this network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that starts an address resolution service on a network element after a boot-up of this network element is described. In one embodiment, the network element participates as a peer in an MLAG topology, which allows this network element and the other peer in the MLAG topology to act as a single network element. In this embodiment, an MLAG topology allows a host to be coupled to the multiple network elements for physical diversity, while still only having a single bundle interface to manage. In an MLAG topology, one of the network elements is a primary and another is a secondary. In one embodiment, the primary perform similar functions (receive and forward data, fulfill address resolution requests, or other network functions), except the primary network element can perform a Spanning Tree Protocol (STP) service, with the secondary network element acting in a standby mode for the STP service. In one embodiment, this network element is a primary network element in the MLAG topology and the other network element is a secondary network element. In addition, these two network elements are first hop gateways as these network elements couple a layer 2 network with a layer 3 network. In one embodiment, these two network elements are the first hop gateway for devices coupled to the layer 2 network. By being the first hop gateway, each of these network elements runs an address resolution service that returns a mapping between a layer 2 and a layer 3 address for a coupled device. In one embodiment, the address service is an address resolution protocol (ARP) service.

In one embodiment, if the primary network element reboots, the secondary network element takes over for the primary network elements. As the formerly primary network element comes back up, this network elements does not have an address resolution table, because this table is not persistent across a network element reboot. In addition, the ports are in an error disable state as the former primary network element is booting up. Instead of bringing the ports back to an up state after the reload delay, the formerly primary network element sends a request for the address resolution table to the formerly secondary (now primary) network element. In addition, the former primary network element maintains the ports that are part of the MLAG in the error disable state. The now primary network element sends the address resolution table to the now secondary network element. The now secondary network element installs the address resolution table and brings the MLAG ports into a normal state from the error disable state. This allows the now secondary network element to handle address resolution requests with a current (or nearly current) address resolution table. The boot up process can also be applied to network elements is a Virtual Router Redundancy (VRRP) topology.

In another embodiment, a network element includes a primary central processing unit (CPU) and a standby CPU. In this embodiment, the standby CPU takes over the processing unit operations for the primary CPU in case the primary CPU fails or reboots. Prior to the CPU failing, the primary CPU periodically sends the address resolution table to the standby CPU. The standby CPU receives the address resolution table and programs this table. In one embodiment, the primary CPU sends the address resolution table every five minutes (or another time period, such as one minute, 30 seconds, 10 minutes, or time period that is greater, smaller, or different (e.g., the synchronization period can be based on an ARP aging interval that is configured for the ARP service)). If the primary CPU fails, the standby CPU takes over, including the responsibility of running the address resolution service. Before starting the address resolution service, the standby CPU reconciles the address resolution table of the standby CPU with the hardware address resolution table used by the forwarding engine(s) of the network element. The standby CPU starts the address resolution service with the reconciled address resolution table and takes over the other processing unit operations from the primary CPU.

FIG. 1 is a block diagram of one embodiment of a system 100 with a multi-chassis link aggregation (MLAG) topology for a pair of network elements. In one embodiment, network elements 102A-B couple a layer 3 network 106 with a layer 2 network 116. In one embodiment, the layer 3 network 106 is a network that forwards data packets using layer 3 information contained in those data packets. For example and in one embodiment, a layer 3 network can be an Internet Protocol (IP) network, in which forwarding decisions are made on the IP address included in the data packets. In another embodiment, the layer 2 network 116 is a network that forwards data packets using layer 2 information contained in those data packets. For example and in one embodiment, a layer 2 network can be an Ethernet network, in which forwarding decisions are made on the media access control (MAC) address included in the data packets. In one embodiment, these data packets include both IP and MAC addresses, and which address is used for a forwarding decision is based on how each of the networks is configured. In one embodiment, network elements 102A-B are coupled with each other over a peer link 108.

In one embodiment, because network elements 102A-B couple the layer 2 network 116 with the layer 3 network 106, the network elements 102A-B are each a first hop gateway to the layer 3 network 106 for devices coupled to the layer 2 network 116. Thus, each of the network elements 102A-B gives access to the layer 3 network 106 for network element 104 and devices 112A-B. In this embodiment, network element 104 is a layer 2 switching device that couple devices 112A-C to network elements 102A-B. The network elements 102A-B and/or 104 can each be a device that provides network access to a network (e.g., physical network, virtualized network, etc.). A network element can be a switch, router, hub, bridge, gateway, etc., or any type of device that can provide access to a network. In a further embodiment, the network element 102A-B and/or 104 can be a device that communicates with a network (e.g., server, personal computer, or another device that can communicate with a network). In one embodiment, one or more of the network elements 102A-B and/or 104 can be a physical or virtual device. In one embodiment, the devices 112A-C can be a server, computer, switch, network element, or another type of device that can communicate data with a network.

In order to increase the bandwidth availability and redundancy for access to layer 3 network 106, network elements 102A-B and 104 can form a multi-chassis link aggregation group (MLAG) between them. In one embodiment, an MLAG is a way to inverse multiplexing multiple links between network elements to increase bandwidth availability and redundancy. In addition, network elements participating in an MLAG will have two or more network elements configured to act like a single network element when forming the link aggregation groups. In this embodiment, this allows a device to uplink to the two network elements 102A-B. In one embodiment, the MLAG 110 includes network elements 102A-B each having a separate link to the network element 104, respectively. Thus, in MLAG 110, there are two links between the network elements 102A-B and 104. However, for each of devices 112A-C, MLAG 110 appears as a single link to the layer 3 network 106.

Because the network elements 102A-B are the first hop gateway for devices 112A-C and couple the layer 2 network 116 to the layer 3 network 106, the network elements 102A-B maintain an address resolution table that is a mapping between the layer 2 and layer 3 addresses for each of the network element 104 and devices 112A-E as well as other devices in the layer 2 network 116. The devices 112A-C and network element 104 will each have two different addresses assigned to them: a layer 3 address (e.g., an Internet Protocol (IP) address) and a layer 2 address (e.g., a Media Access Control (MAC) address). For a device that wants to send a packet to another device and does not know the layer 3→4 layer 2 address mapping, the sending device will broadcast a request to determine the corresponding layer 3 address for the layer 2 address. For example, the sending device broadcasts an ARP address request to local network elements (e.g., network elements 102A-B) to determine a MAC address that corresponds to an IP address. The network element 102A-B can answer the ARP request, using an ARP response packet as is known in the art.

The network element 102A-B maintains an association between the layer 3 address and a corresponding layer 2 address in a table. For example and in one embodiment, a network element 102A-B uses an ARP table to include one or more ARP entries. Each entry maintains an association between a source IP and source MAC address. Each association is valid for a certain period of time, after which the association expires. Expiration times can range from a matter of seconds to twenty minutes or more.

In the MLAG 110, one of the network elements 102A-B will be a primary member of the MLAG 110 and the other network element will be a secondary member. In one embodiment, each of the network elements 102A-B maintains an ARP table. In this embodiment, the ARP table is not persistent and, thus, if one of the network elements 102A-B reboots, that network element will lose this ARP table and resume operations with a blank ARP table. This can be a big problem if that network element is handling address resolution requests for hundreds or thousands of devices. In one embodiment, if the primary network element 102A reboots, instead of bringing up the ports that are art of the MLAG to a normal state, the network element 102A sends a request to the secondary network element 102B to synchronize the ARP table and maintains the MLAG ports in an error disable state. The network element 102B sends a copy of the ARP table to network element 102A. The network element 102A takes this ARP table and installs it. With the table installed, the network element 102A brings the MLAG ports into a normal state, which allows the address resolution service using the installed ARP table to resume and, further, resumes MLAG service operation.

Figure 2:
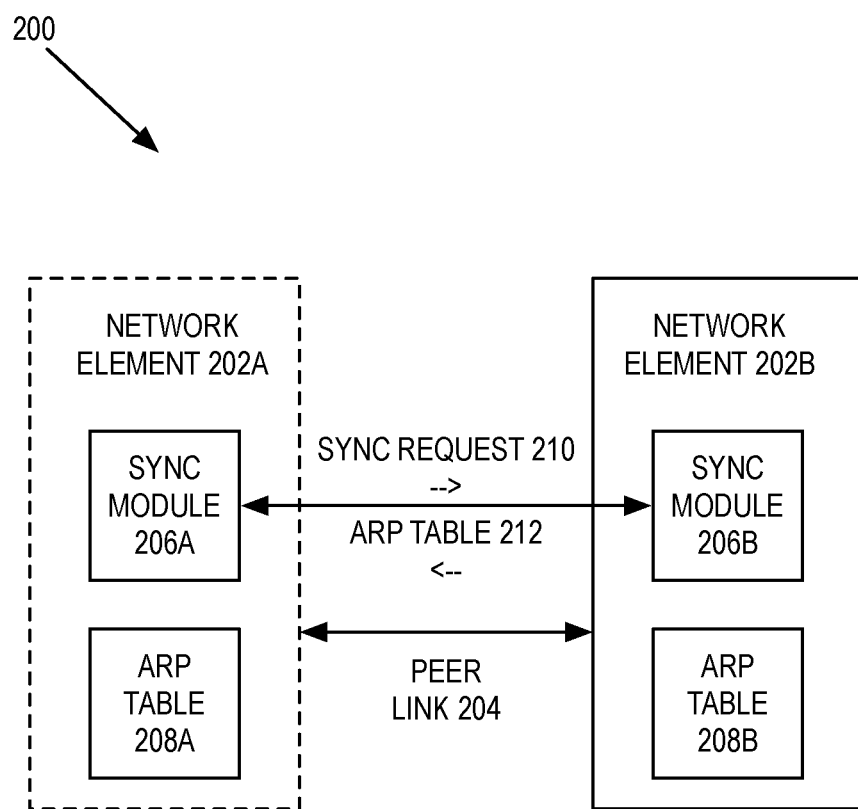
FIG. 2 is a block diagram of one embodiment of a pair of MLAG peers that synchronize an address resolution table.

FIG. 2 is a block diagram of one embodiment of a system 200 with pair of MLAG peers 202A-B that synchronizes an address resolution table. In FIG. 2, network elements 202A-B each include a synchronized module 206A-B and an ARP table 208A-B. In one embodiment, the synchronize module 206A-B sends ARP table synchronize requests and fulfills those requests. In this embodiment, a network element 202A will send out an ARP table synchronize request after network element 202A reboots and wants to build an ARP table when configured as an MLAG peer in an MLAG topology. In addition, the ARP table 208A-B is a cache that includes layer 3 to layer 2 address mapping as well as other information (e.g., expiration time, or other information for this mapping). In one embodiment, network element 202A is a primary in the MLAG topology and network element 202B is the secondary. In this embodiment, if network element 202A reboots or otherwise goes off-line, network element 202B would become the primary device in this MLAG topology.

If the network element 202A reboots, network element 202A would lose the ARP table 208A because this table is not persistently stored, after, a persistently stored ARP table is out of date after reboot (especially if the network element 202A is down for several hours, days, or longer). Instead of restarting the address resolution service with a blank ARP table 208A, network element 202A sends an ARP table synchronize request to network element 202B so as to get a copy of ARP table 208B. Network element 202A would install this copy of the ARP table 208B on network element 202A, and would use this new ARP table 208A to restart the address resolution service. In one embodiment, network element 202A sends the ARP table request to network element 202B. Network element 202B receives this request, serializes the ARP table 208B, and sends the serialized ARP table back to network element 202A. Network element 202A receives the serialized table and installs this table on network element 202A as the ARP table 208A to be used to support the address resolution service on network element 202A. At this point, network element 202A has the same ARP table as network element 202B or a table that is nearly the same. In one embodiment, the two ARP tables 208A-B may differ as network element 202B may receive additional updates to ARP table 208B during the synchronization process. In this embodiment, for the relatively few entries that are out of sync, network element 202A would send out ARP requests as needed to update the ARP table 208A. With the newly installed ARP table 208A, network element 202A starts the address resolution service.

By installing a copy of the ARP table 208B, network element 202A becomes more efficient as to starting an address resolution service with a blank ARP table because network element 202A would need to send out needless ARP requests. In one embodiment, these extra ARP requests can become a big burden on the network if the ARP table 208B has hundreds or thousands of entries. Without a current, or nearly current, ARP table 208A, network element 202A may cause a drop in traffic across the layer 2 network because network element 202A will need to build up the ARP entries in ARP table 208A. Thus, by using this synchronization process after a reboot, this process advances the technical field of network technology by eliminating or reducing traffic loss after an MLAG peer reboots. In one embodiment, this process is executed by first hop gateway, in which the first hop gateway is a network element that straddles two different networks (e.g., network elements 102A-B that straddle the layer 2 network 116 and the layer 3 network 106 as illustrated in FIG. 1 above). Synchronization between these two network element peers is further described in FIGS. 3A-B below.

Figure 3:
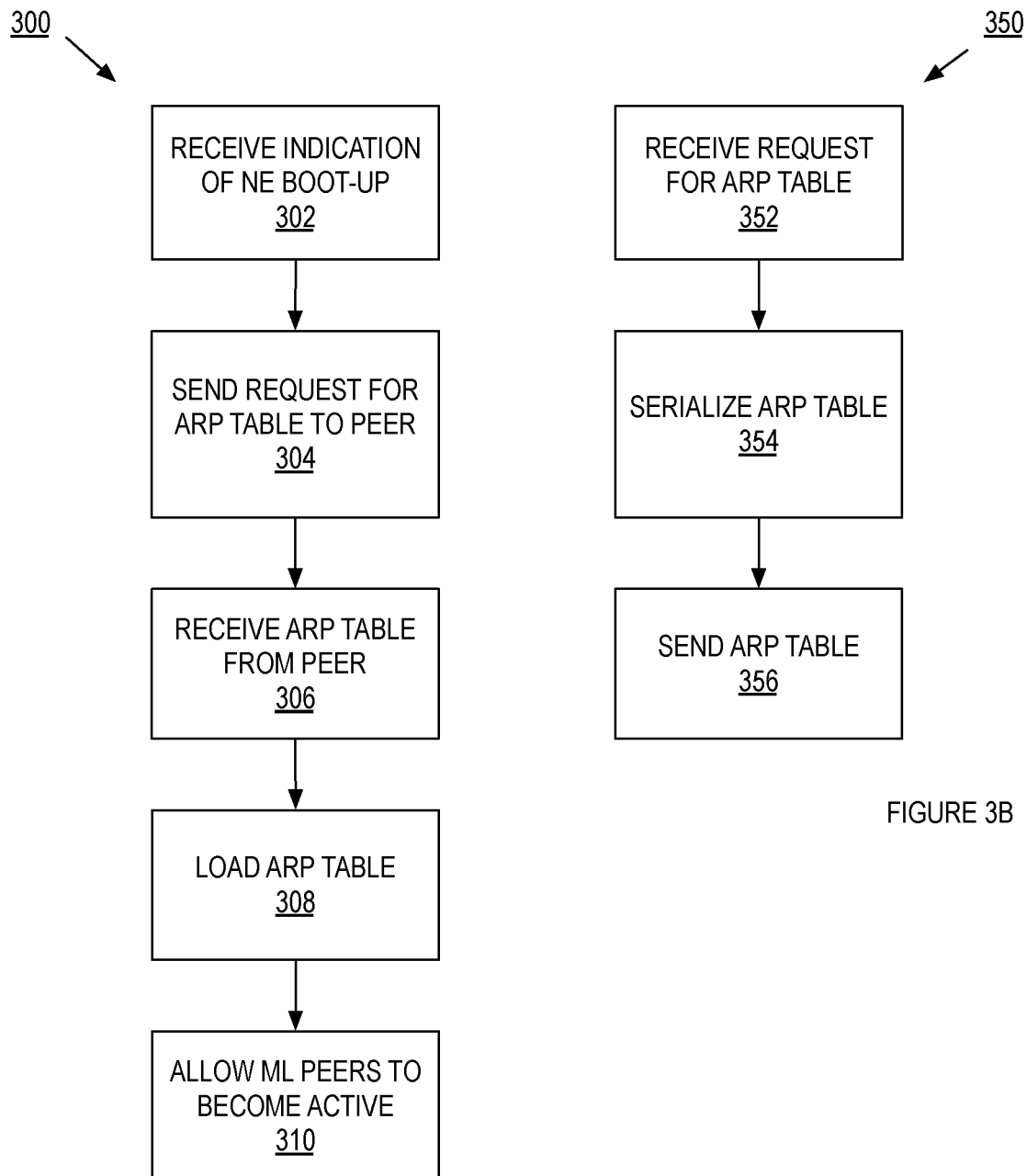
FIG. 3A is a flow diagram of a process to synchronize an address resolution table.
FIG. 3B is a flow diagram of a process to synchronize an address resolution table.

FIGS. 3A and 3B are flow diagrams of processes to synchronize an address resolution table. FIG. 3A is a flow diagram of a process 300 to request an address resolution table from a network element peer. In one embodiment, process 300 is performed by a synchronization module to request an address resolution table from a network element peer, such as synchronization modules 206A-B as described in FIG. 2 above for a secondary network element in an MLAG topology. In this embodiment, process 300 is performed by a secondary network element in an MLAG topology. In FIG. 3A, process 300 begins by receiving an indication of the boot up by a network element at block 302. In one embodiment, the indication of the boot up for a network element can be an indication to start an address resolution service, where the network element is configured as an MLAG peer with another network element. For example and in one embodiment, network element 202A is peered with network element 202B and configured in an MLAG environment with network element 202B. During the reboot, the ports of the network element 202A, except for the peer link port, are put in the error disable state and remain in the error disable state until the address resolution table is installed. In one embodiment, a port in an error disable state does not transmit or receive data with another device coupled to this port. For example and in one embodiment, a port in an error disable state would not receive ARP requests or serve these requests. At block 304, process 300 sends a request for an address resolution table.

Process 300 receives the address resolution table from the peered network element at block 306. In one embodiment, the address resolution table is a serialized table that is serialized for transmission. At block 308, process 300 loads the address resolution table. In one embodiment process 300 takes the serialized address resolution table, builds the address resolution table entries, and stores these entries in the address resolution table. For example and in one embodiment, for each set of layer 3 to layer 2 address mappings (as well as other information), process 300 builds a new address resolution table entry. After processing these entries, process 300 stores the address resolution entries in the new address resolution table. At block 310, process 300 brings up the peer link ports in an error disable state to a normal state, which allows the MLAG service to start and the address resolution service to receive and fulfill address resolution requests. In one embodiment, a port in a normal state can transmit and receive data with another device coupled to the port. In this embodiment, the network element can receive and fulfill address resolution requests via the port in the normal state.

FIG. 3B is a flow diagram of a process 350 to fulfill an address resolution table request from a network element peer. In one embodiment, process 350 is performed by a synchronization module to fulfill the address resolution table request from a network element peer, such as synchronization modules 206A-B as described in FIG. 2 above. In this embodiment, process 350 is performed by a primary network element in an MLAG topology. In FIG. 3B, process 350 begins by receiving an address resolution table request at block 352. At block 354, process 350 serializes the address resolution table, so as to make the address resolution table ready for transmission to the requesting network element. In one embodiment, process 350 serializes the address resolution table by converting the stored address resolution table into a format that is easier to transmit. Process 350 since the serialized address resolution table to the requesting network element at block 356.

Figure 4:
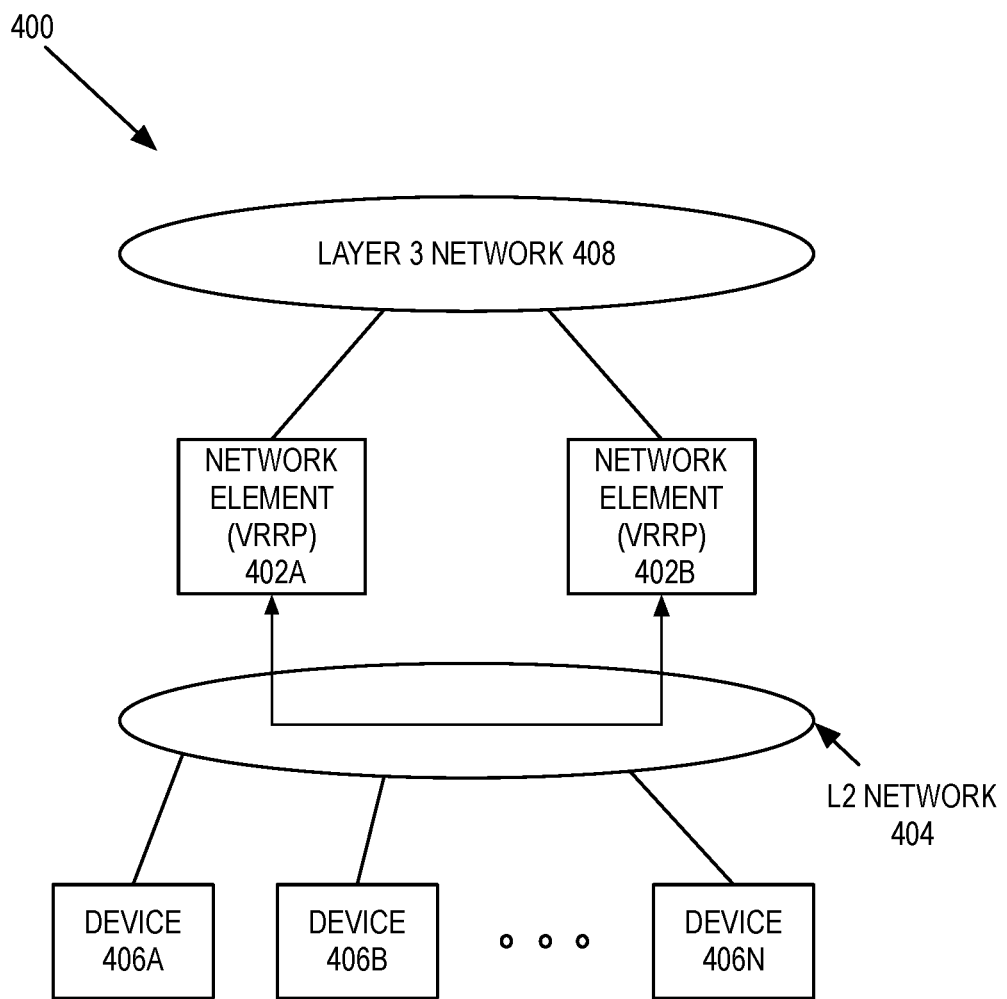
FIG. 4 is a block diagram of a system with network elements that participate in a Virtual Router Redundancy Protocol (VRRP) topology.

While in one embodiment, the address resolution table synchronization process is performed by network elements in an MLAG topology, in alternate embodiments, this address resolution table synchronization process can be performed by network elements in other types of topology. For example and in one embodiment, network elements that are first hop gateways in a virtual router redundancy protocol (VRRP) topology can use this address resolution table synchronization process to restart and address resolution service if one of the network elements reboots (for either IPv4 or IPv6). FIG. 4 is a block diagram of a system 400 with network elements that participate in a VRRP topology. In FIG. 4, network elements 402A-B are in a VRRP topology, in which these network elements 402A-B are first hop gateways for devices 406A-B and couples layer 2 network 404 with layer 3 network 406. In one embodiment, layer 3 network 406 is an IPv4 network. The network elements 402A-B can each be a device that provides network access to a network (e.g., physical network, virtualized network, etc.). A network element can be a switch, router, hub, bridge, gateway, etc., or any type of device that can provide access to a network. In a further embodiment, the network elements 402A-B can be a device that communicates with a network. In one embodiment, one or more of the network elements 402A-B can be a physical or virtual device. In one embodiment, the devices 406A-N can a server, computer, switch, network element, or another type of device that can communicate data with a network.

In one embodiment, because network elements 402A-B are first hop gateways for the layer 3 network 408, network elements 402A-B each maintain an address resolution table. Network element 402A is a primary and network element 402B is the secondary in the VRRP topology. In this embodiment, if network element 402A reboots, network element 402B becomes the primary and network element 402A sends an address resolution table request to network element 402B to get a copy of the address resolution table stored on network element 402B. Network element 402B receives and fulfills this request by sending a serialized copy of the address resolution table to network element 402A. Network element 402A in a VRRP topology, does not put ports into an error disabled state. Instead, the network element 402A that is a VRRP master reboots and comes up as a VRRP backup router. The network element 402A waits for the VRRP hello packet from the new VRRP master. If this indicates that the new VRRP master has a lower priority (which will be the case as the priority is controlled by configuration), the network element 402A assumes the role of VRRP master and the network element 402B becomes the VRRP backup. After a reboot, network element 402A performs the address resolution request and fulfillment process as described above in FIGS. 3A and 3B and ignores the VRRP hello packets until the address resolution synchronization is complete. Once network element 402A has completed this synchronization, network element will resume processing the VRRP hellos from the peer and transition to the master VRRP router. This will reduce or remove any traffic loss. In one embodiment, network elements 402A-B performs the address resolution request and fulfillment process as described above in FIGS. 3A and 3B.

Figure 5:
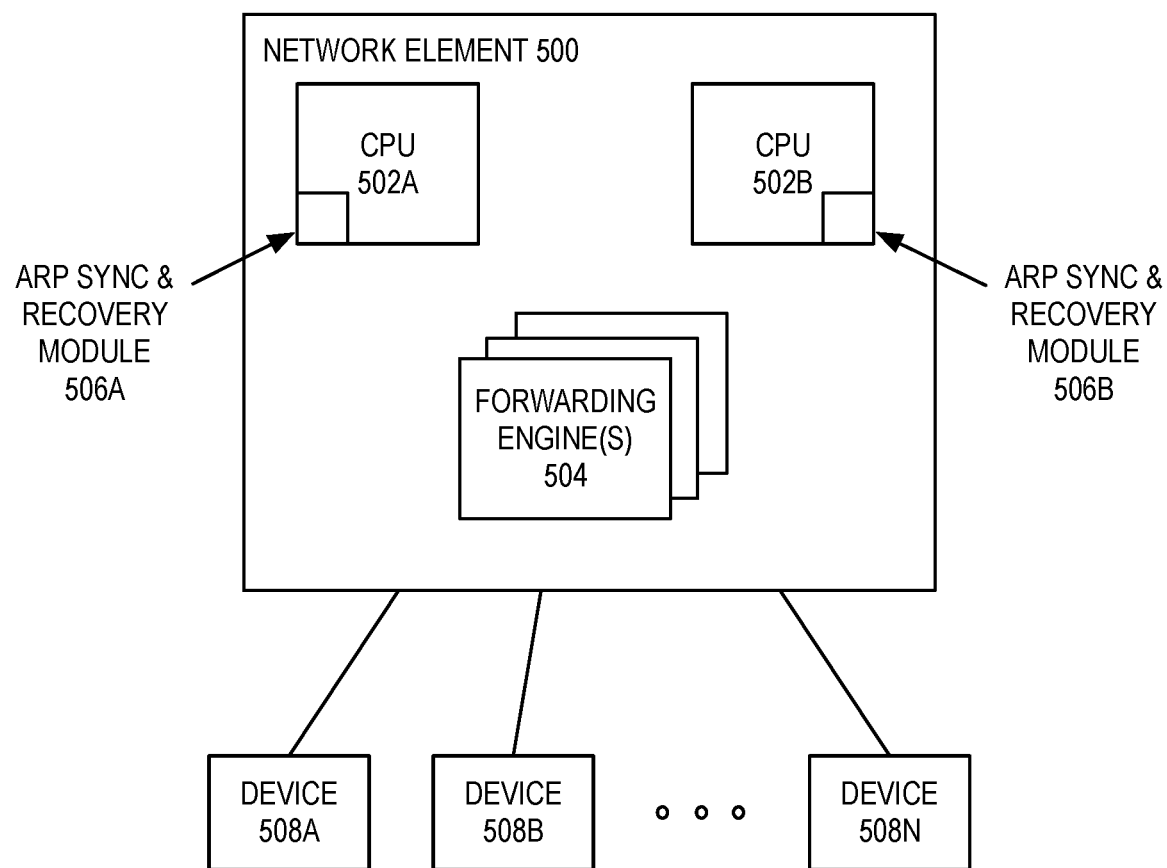
FIG. 5 is a network element with multiple central processing units (CPUs).

FIG. 5 is a network element 500 with multiple central processing units (CPUs) 502A-B. In FIG. 5, the network element 500 includes CPUs 502A-B and forwarding engines 504. In one embodiment, the CPUs 502A-B are each a processing unit that is used to control the processing functions of the network element 500. For example and in one embodiment, the primary CPU 502A controls the configuration of the forwarding engine(s) 504, retrieves the stored monitoring data, retrieves stored statistics, and/or performs other control functions. In one embodiment, the network element has a primary CPU 502A and a standby CPU 502B. In this embodiment, if the primary CPU 502A goes down, the standby CPU 502B takes and resumes the operations of the previously primary CPU 502A. In addition, CPU 502A becomes the standby CPU. Furthermore, the forwarding engines 504 can each receive, process, and/or forward network traffic. In one embodiment, each hardware forwarding engine 504 includes one or more hardware tables that are used to store configuration data, monitoring data, reporting data, and/or other management data for the hardware forwarding engine 504.

In one embodiment, each of the CPUs 502A-B includes an ARP sync and recovery module 506A-B, respectively. In this embodiment, the network elements 504A-B used the ARP sync and recovery module 506A-B to synchronize the ARP tables between the two CPUs 502A-B. Each CPU 502A-B maintains a copy of the ARP table. Periodically, the two CPUs 502A-B synchronize the ARP table between the two CPUs 502A-B. For example and in one embodiment, the active CPU 502A maintains and updates the ARP table based on the information received by the network element 500 (e.g., receiving ARP updates from the network, etc.). In this example, the active CPU 502B will periodically send the current ARP table to the standby CPU 502A, where the standby CPU 502B receives this ARP table and incorporates the table into the state maintained by the standby CPU 502B. Alternatively, the standby CPU 502B can periodically request and receive the current ARP table from the active CPU 502A. In one embodiment, the periodicity of synchronization can be on the order of minutes, such as 5 minutes or another period (e.g., the synchronization period can be based on an ARP aging interval that is configured for the ARP service). In this embodiment, the standby CPU 502B sends a request to the active CPU 502A. The active CPU 502A sends a copy of the ARP table to the standby CPU 502B. The standby CPU 502B stores the ARP table. By periodically updating the ARP tables instead of continually updating them, the network element operates more efficiently. In topologies with thousands of devices, there may be a continual churn in the ARP table entries. By periodically synchronizing the ARP tables, the network element reduces the number of synchronizations that are employed by the network element. In addition, each forwarding engine 504 includes a hardware-stored ARP table (not illustrated).

If the active CPU 502A goes down or restarts, the standby CPU 502B takes over and becomes the active CPU. The now-active CPU, CPU 502B, starts an address resolution service using the stored ARP table. Prior to starting this service, CPU 502B determines if the ARP table stored for the CPU is the same as the ARP table stored with the forwarding engine(s) 504. If not, CPU 502B reconciles the differences between the two APR tables so that the two ARP tables are the same. Keeping a software based ARP table synchronized is further described in FIGS. 6 and 7 below.

Figure 6:
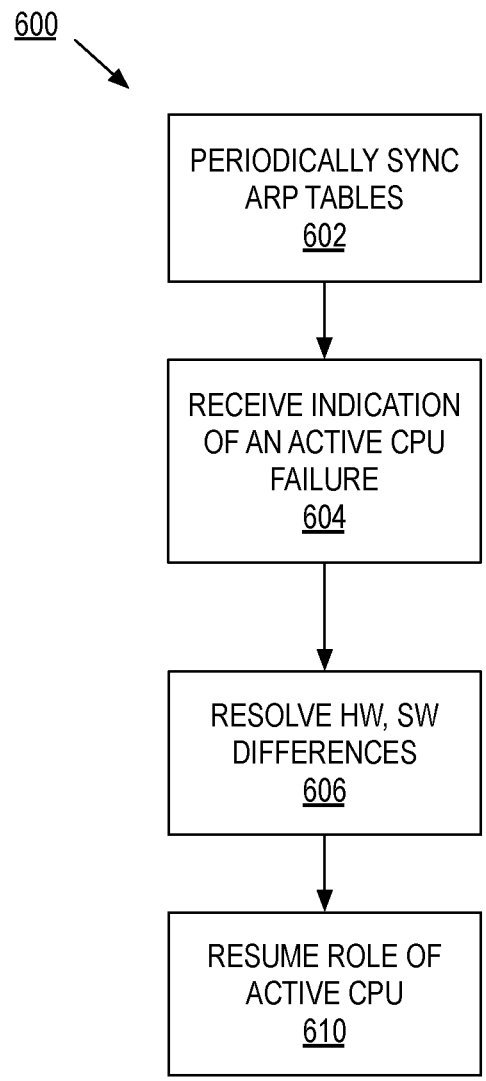
FIG. 6 is a flow diagram of one embodiment of a process to synchronize an address resolution table between multiple CPUs.

FIG. 6 is a flow diagram of one embodiment of a process 600 to synchronize an address resolution table between multiple CPUs. In one embodiment, process 600 is performed by an ARP sync and recovery module, such as the ARP sync and recovery module 506A-B as described in FIG. 5 above. In FIG. 6, process 600 beings by periodically synchronizing the ARP tables at block 602. In one embodiment, process 600 periodically synchronizes the tables. In this embodiment, process 600 receives the current ARP table form the active CPU. Process 600 installs the ARP table for the standby CPU to use. At block 604, process 600 receives an indication of a CPU failure. In one embodiment, the active CPU fails and process 600 receives an indication that this CPU is no longer available. In this embodiment, the standby CPU will take over the CPU operations from the active CPU. Process 600 reconciles the hardware and software differences in the respective ARP tables at block 606. In one embodiment, the ARP table currently available to the standby CPU may be out of date as this ARP table is periodically synchronized with the ARP table maintained by the previously active CPU. There is a current version of the ARP table that is maintained by the forwarding engine(s). In this embodiment, process 600 determines if there are any entries that are different between the hardware ARP table maintained by the forwarding engine(s) and the software ARP table available to the standby CPU. If there are differences, process 600 updates the software ARP table so that the software ARP table has the same entries as the hardware ARP table. Reconciling the hardware and software ARP tables is further described in FIG. 7 below. At block 608, process 600 resumes the role of the now active CPU. In one embodiment, this resumption of operations includes starting and address resolution service using the updated ARP table.

Figure 7:
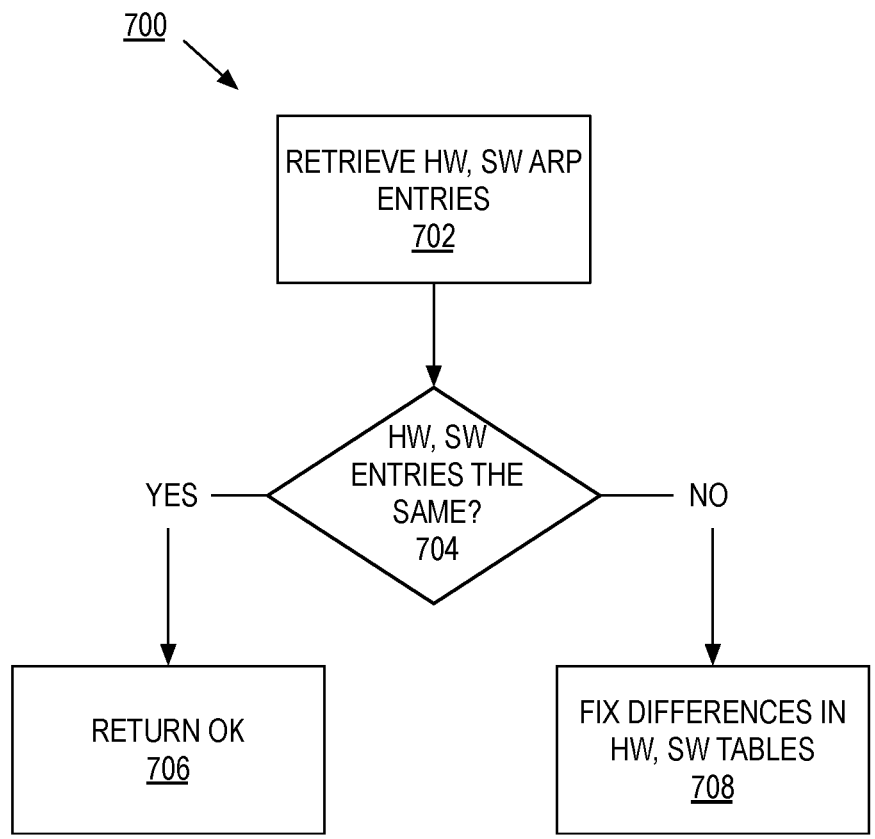
FIG. 7 is a flow diagram of one embodiment of a process to reconcile differences between hardware and software address resolution tables.

FIG. 7 is a flow diagram of one embodiment of a process 700 to reconcile differences between hardware and software address resolution tables. In one embodiment, process 700 is performed by an ARP sync and recovery module, such as the ARP sync and recovery module 506A-B described in FIG. 5 above. In FIG. 7, process 700 begins by retrieving the hardware and software ARP entries in one embodiment, the hardware and software ARP entries may be different, because the software ARP table may not have been recently synchronized. At block 704, process 700 determines if the hardware and software ARP entries are the same. If these entries are the same, process 700 returns an okay at block 706. If there are differences, at block 708, process 700 fixes the differences between the hardware and software ARP entries. For example and in one embodiment, if there is an entry present in the hardware ARP table that is missing in the software ARP table, process 700 sends out an ARP request to determine the missing ARP entry. If there is an ARP entry that is present in the software ARP table, but not present in the hardware ARP table, process 700 deletes the entry from the software ARP table.

Figure 8:
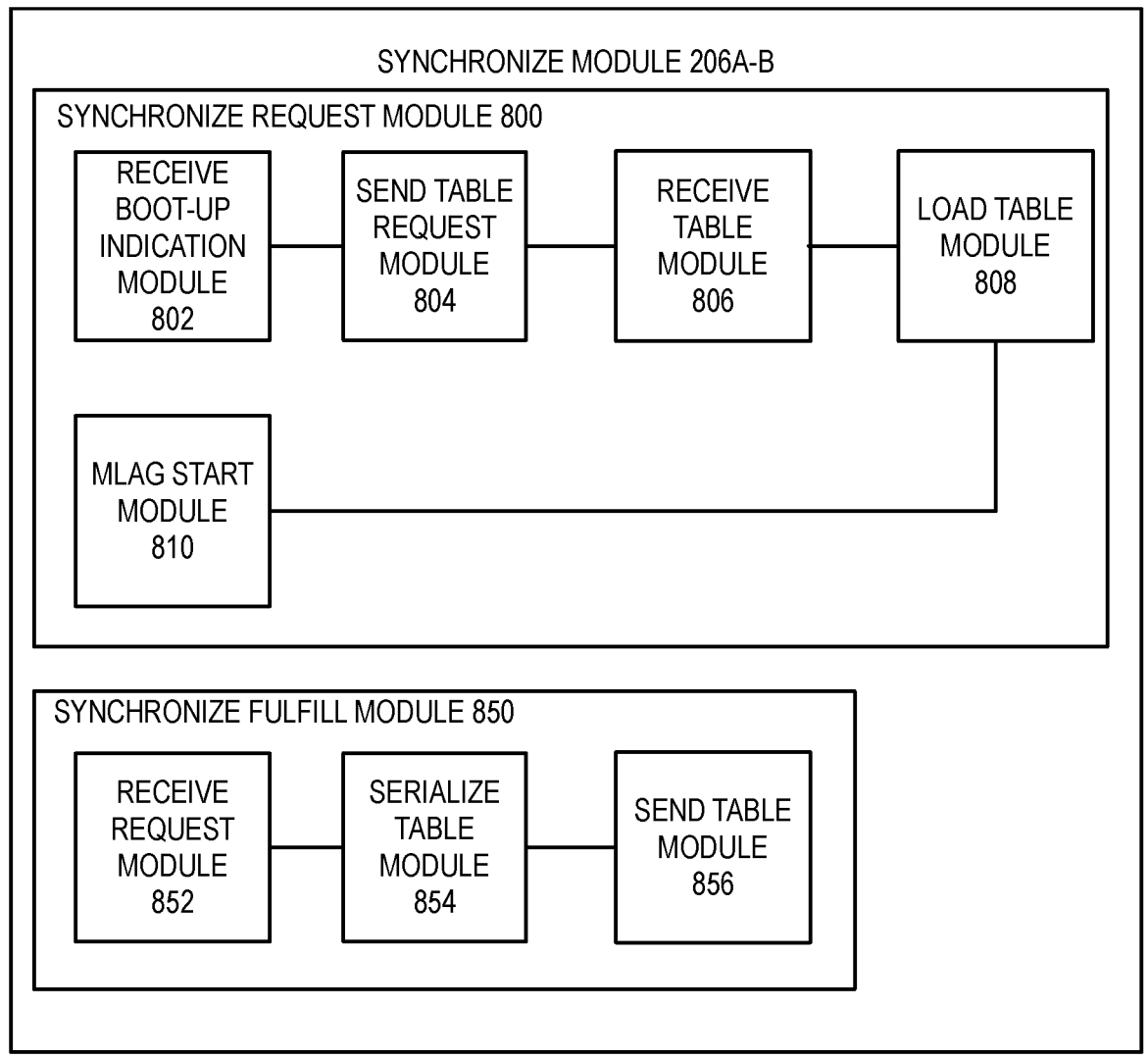
FIG. 8 is a block diagram of one embodiment of a synchronize module that synchronizes an address resolution table.

FIG. 8 is a block diagram of one embodiment of a synchronize module 206AB that synchronizes an address resolution table. In one embodiment, the synchronize module 206AB includes synchronize request module 800 and synchronize fulfill module 850. In one embodiment, the synchronize request module 800 includes receive boot-up indication module 802, send table request module 804, receive table module 806, load table module 808, and ML start module 810. In one embodiment, the receive boot-up indication module 802 receives an indication of a boot-up as described in FIG. 3A, block 302 above. The send table request module 804 send an address resolution table request as described in FIG. 3A, block 304 above. The receive table module 806 receives the address resolution table as described in FIG. 3A, block 306 above. The load table module 808 loads the address resolution table as described in FIG. 3A, block 308 above. The MLAG start module 810 allows the multi-link service to become active by putting the multi-link ports into a normal state as described in FIG. 3A, block 310 above.

The synchronize fulfill module 850 includes the receive request module 852, serialize table module 854, and send table module 856. In one embodiment, the receive request module 852 receives a request for an address resolution table as described in FIG. 3B, block 352 above. The serialize table module 854 serializes the address resolution table as described in FIG. 3B, block 354 above. The send table module 856 sends the address resolution table as described in FIG. 3B, block 356 above.

Figure 9:
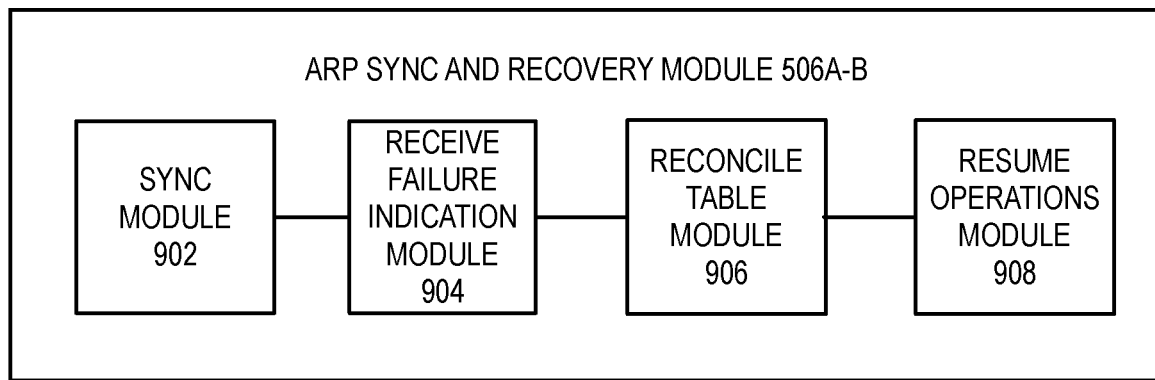
FIG. 9 is a block diagram of one embodiment of an ARP synchronize and recovery module that synchronizes an address resolution table between multiple CPUs.

FIG. 9 is a block diagram of one embodiment of an ARP synchronize and recovery module 506AB that synchronizes an address resolution table between multiple CPUs. In one embodiment, the ARP synchronize and recovery module 506AB includes synchronize module 902, receive failure indication module 904, reconcile table module 906, and resume operations module 908. In one embodiment, the synchronize module 902 synchronizes the address resolution table with the primary CPU as described in FIG. 6, block 602 above. The receive failure indication module 904 receives a failure indication of the primary CPU as described in FIG. 6, block 604 above. The reconcile table module 906 reconciles the hardware and software address resolution tables as described in FIG. 6, block 606 above. The resume operations module 908 resumes the operations of the CPU as described in FIG. 6, block 608 above.

Figure 10:
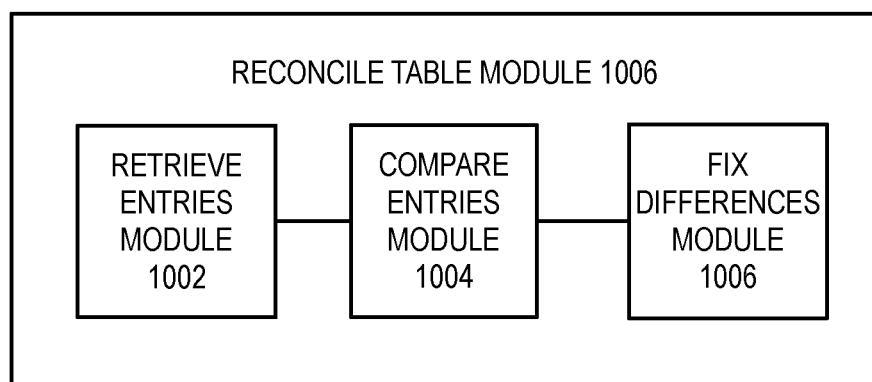
FIG. 10 is a block diagram of one embodiment of ARP resolution module that reconciles differences between hardware and software address resolution tables.

FIG. 10 is a block diagram of one embodiment of reconcile table module 1006 that reconciles differences between hardware and software address resolution tables. In one embodiment, the reconcile table module 1006 includes retrieve entries module 1002, compare entries module 1004, and fix differences module 1006. The retrieve entries module 1002 retrieves the address resolution entries from the hardware and software address resolution table entries as described in FIG. 7, block 702 above. The compare entries module 1004 compares the hardware and software address resolution table entries as described in FIG. 7, block 704 above. The fix differences module 1006 fixes the differences between the hardware and software address resolution table entries as described in FIG. 7, block 708 above.

Figure 11:
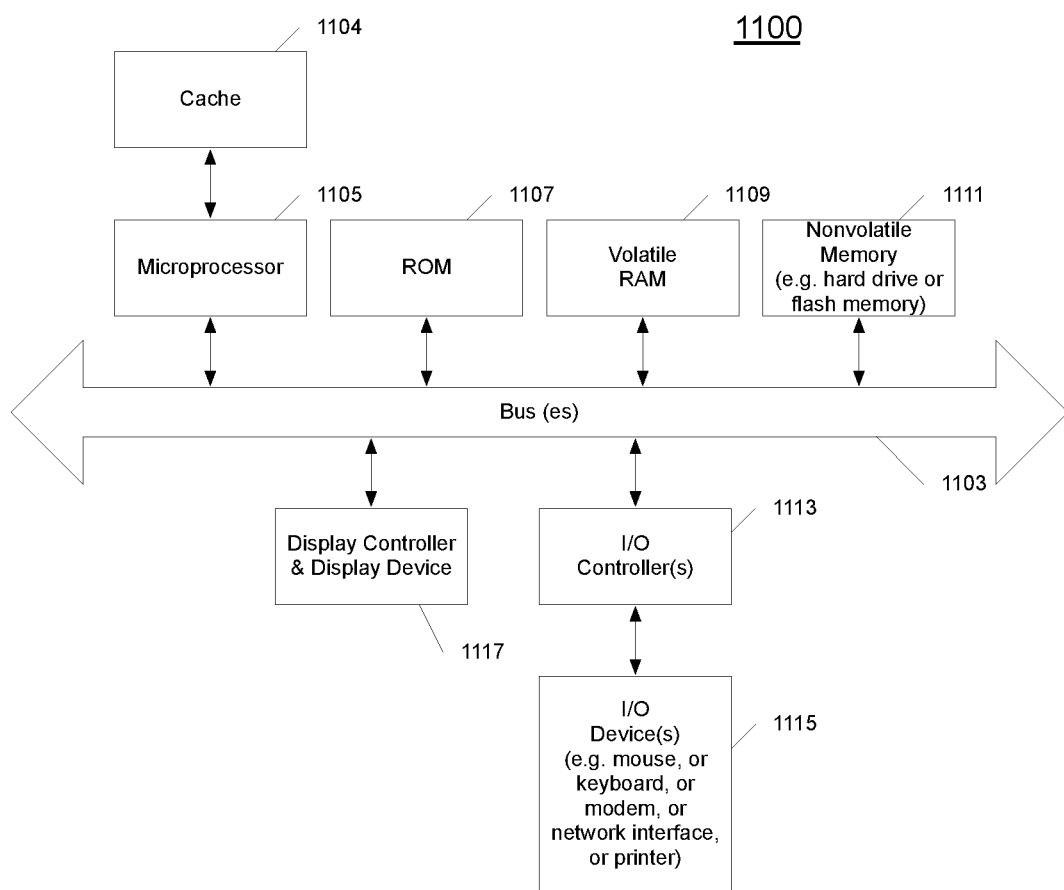
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented including a network elements 102A-B and/or 104A-B as shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1117 and to peripheral devices such as input/output (I/O) devices which may be mice, keyboards, modems, network interfaces, printers and other devices which are well known in the art. In one embodiment, the system 1100 includes a plurality of network interfaces of the same or different type (e.g., Ethernet copper interface, Ethernet fiber interfaces, wireless, and/or other types of network interfaces). In this embodiment, the system 1100 can include a forwarding engine to forward network date received on one interface out another interface.

Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
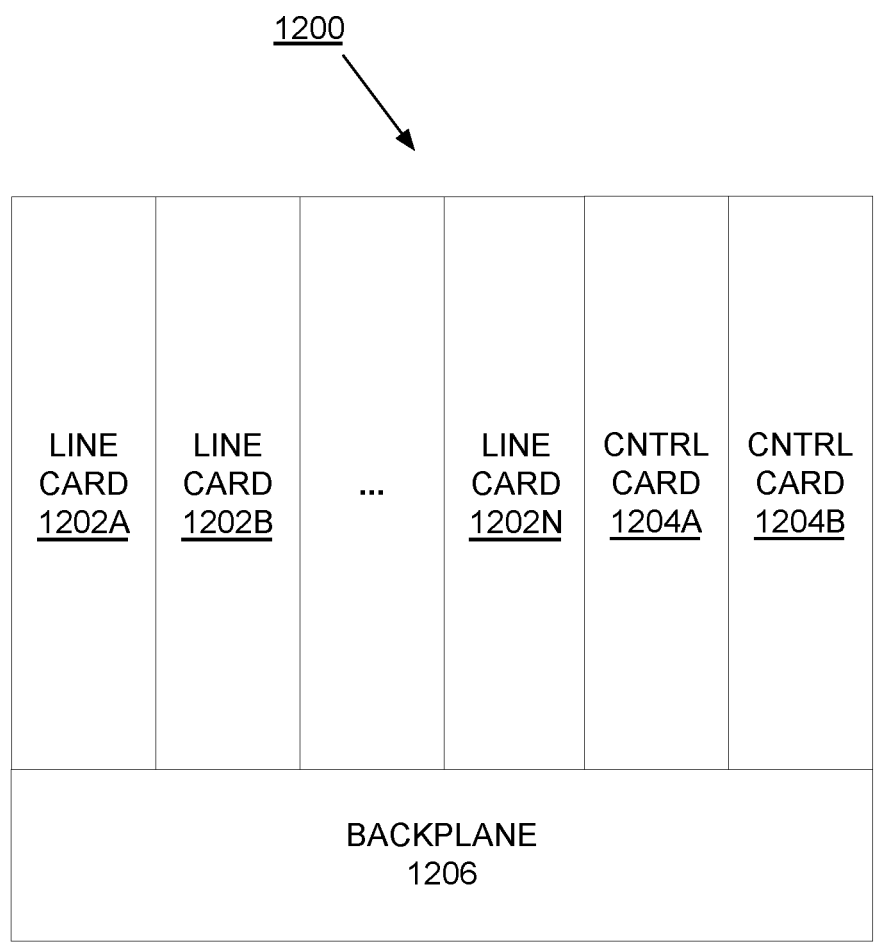
FIG. 12 is a block diagram of one embodiment of an exemplary network element that synchronizes an address resolution table of a network element.

FIG. 12 is a block diagram of one embodiment of an exemplary network element 1200 that synchronizes an address resolution table of a network element table of a network element. In FIG. 12, the backplane 1206 couples to the line cards 1202A-N and controller cards 1204A-B. While in one embodiment, the controller cards 1204A-B control the processing of the traffic by the line cards 1202A-N, in alternate embodiments, the controller cards 1204A-B, perform the same and/or different functions (e.g., synchronizing an address resolution table of a network element table of a network element, etc.). In this embodiment, one, some, or all of the controller cards 1204A-B includes the synchronize module to synchronizes an address resolution table or a ARP sync and recovery module to synchronize an address resolution table between multiple CPUs in this network element 1200, such as the synchronize module 206A-B as described in FIG. 2 above or ARP sync and recovery module 506A-B as described in FIG. 5 above. In one embodiment, the line cards 1202A-N process and forward traffic according to the network policies received from controller cards the 1204A-B. It should be understood that the architecture of the network element 1200 illustrated in FIG. 12 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "determining," "performing," "forwarding," "storing," "identifying," "updating," "synchronizing," "reconciling," "starting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to boot-up of a first processing unit in a network element, the method comprising:
   periodically synchronizing software address resolution information between the first and a second processing unit of the network element;
   receiving an indication of the boot-up of the first processing unit;
   determining differences between a hardware address resolution information and the software address resolution information;
   reconciling the differences so that the hardware and the software address information includes the same address resolution entries; and
   starting the address resolution service on the first processing unit,
   wherein the network element is a network element peer of another network element in a multi-chassis link aggregation topology.

2. The non-transitory machine-readable medium of claim 1, wherein the address resolution information is Address Resolution Protocol information.

3. The non-transitory machine-readable medium of claim 1, wherein the synchronizing software address resolution information comprises:
   receiving the address resolution information; and
   installing the address resolution information.

4. The non-transitory machine-readable medium of claim 1, wherein reconciling the differences comprises:
   retrieving the hardware and software address information; and
   fixing differences between the hardware and software address information.

5. The non-transitory machine-readable medium of claim 1, wherein the network element is implemented as a first hop gateway.

6. The non-transitory machine-readable medium of claim 1, wherein the network element provides access to a network layer for the first and second processing units from a different network layer.

7. The non-transitory machine-readable medium of claim 6, wherein the network element provides access to a layer 3 network layer for the first and second processing units from a layer 2 network layer.

8. The non-transitory machine-readable medium of claim 1, wherein the resolution table is a serialized table.

9. A network element comprising:
first and second processing units;
one or more processors programmed and configured to perform:
periodically synchronizing software address resolution information between the first and a second processing unit of the network element;
receiving an indication of a boot-up of the first processing unit;
determining differences between a hardware address resolution information and the software address resolution information;
reconciling the differences so that the hardware and the software address information includes the same address resolution entries; and
starting the address resolution service on the, first processing unit,
wherein the network element is a network element peer of another network element in a multi-chassis link aggregation topology.

10. The network element of claim 9, wherein the address resolution information is Address Resolution Protocol information.

11. The network element of claim 9, wherein the synchronizing software address resolution information comprises:
receiving the address resolution information; and
installing the address resolution information.

12. The network element of claim 9, wherein reconciling the differences comprises:
retrieving the hardware and software address information; and
fixing differences between the hardware and software address information.

13. The network element of claim 9, wherein the network element is implemented as a first hop gateway.

14. The network element of claim 9, wherein the network element provides access to a network layer for the first and second processing units from a different network layer.

15. The network element of claim 9, wherein the network element provides access to a layer 3 network layer for the first and second processing units from a layer 2 network layer.

16. The network element of claim 9, wherein the resolution table is a serialized table.

17. A method of starting an address resolution service, the method comprising:
periodically synchronizing software address resolution information between a first and a second processing unit of a network element;
receiving an indication of a boot-up of the first processing unit;
determining differences between a hardware address resolution information and the software address resolution information;
reconciling the differences so that the hardware and the software address information includes the same address resolution entries; and
starting the address resolution service on the first processing unit,
wherein the network element is a network element peer of another network element in a multi-chassis link aggregation topology.

18. The method of claim 17, wherein the address resolution information is Address Resolution Protocol information.

19. The method of claim 17, wherein the synchronizing software address resolution information comprises:
receiving the address resolution information; and
installing the address resolution information.

20. The method of claim 17, wherein reconciling the differences comprises:
retrieving the hardware and software address information; and
fixing differences between the hardware and software address information.

21. The method of claim 17, wherein the network element is implemented as a first hop gateway.

22. The method of claim 17, wherein the network element provides access to a network layer for the first and second processing units from a different network layer.

23. The method of claim 22, wherein the network element provides access to a layer 3 network layer for the first and second processing units from a layer 2 network layer.

24. The method of claim 17, wherein the resolution table is a serialized table.

25. A method of starting an address resolution service, the method comprising:
periodically synchronizing software address resolution information between an first processing unit and a second processing unit of a network element, the first processing unit actively processing an address resolution service;
receiving an indication of the failure of the active processing unit;
determining differences between a hardware address resolution information and the software address resolution information;
reconciling the differences so that the hardware and the software address information includes the same address resolution entries; and
resuming the address resolution service on the second processing unit,
wherein the network element is a network element peer of another network element in a multi-chassis link aggregation topology.

* * * * *